United States Patent
Gintsburg

(10) Patent No.: US 9,667,848 B2
(45) Date of Patent: May 30, 2017

(54) TILTABLE CAMERA MODULE

(71) Applicant: QUALCOMM Incorporated, San Diego, CA (US)

(72) Inventor: Mark Gintsburg, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 14/693,090

(22) Filed: Apr. 22, 2015

(65) Prior Publication Data

US 2016/0316120 A1    Oct. 27, 2016

(51) Int. Cl.
    H04N 5/225    (2006.01)
    H04N 5/232    (2006.01)
    G03B 37/02    (2006.01)

(52) U.S. Cl.
    CPC .......... *H04N 5/2259* (2013.01); *G03B 37/02* (2013.01); *H04N 5/2252* (2013.01); *H04N 5/23232* (2013.01); *H04N 5/23238* (2013.01); *H04N 5/23296* (2013.01)

(58) Field of Classification Search
    CPC ............. H04N 5/23238; H04N 5/2259; H04N 5/23296; H04N 5/2254; G02B 13/06; G03B 13/34; G03B 17/425; G03B 2205/0053
    See application file for complete search history.

(56) References Cited

U.S. PATENT DOCUMENTS

| 6,567,126 | B1 | 5/2003 | Slatter et al. |
| 7,634,184 | B2 | 12/2009 | Woehler et al. |
| 8,848,064 | B2 | 9/2014 | Topliss et al. |
| 2005/0270385 | A1 | 12/2005 | Shioya et al. |
| 2006/0072020 | A1* | 4/2006 | McCutchen ........... G03B 17/02 348/218.1 |
| 2009/0251680 | A1* | 10/2009 | Farsaie ..................... G01C 3/08 356/3 |
| 2009/0303325 | A1* | 12/2009 | Mizuno .................... G03B 3/10 348/143 |
| 2010/0134641 | A1 | 6/2010 | Marti et al. |

(Continued)

FOREIGN PATENT DOCUMENTS

| CN | 203306645 U | 11/2013 |
| JP | 2004320206 A | 11/2004 |

(Continued)

OTHER PUBLICATIONS

International Search Report and Written Opinion—PCT/US2016/020493—ISA/EPO—May 10, 2016.

*Primary Examiner* — Ahmed A Berhan
(74) *Attorney, Agent, or Firm* — Knobbe, Martens, Olson & Bear, LLP

(57) ABSTRACT

This disclosure provides systems, methods and apparatus for tiltable camera modules. In one aspect, the tiltable camera module may be sequentially tilted through a range of positions to capture multiple images in different orientations. The images may then be combined to form a single composite image with a higher resolution and wider field of view than the individual images captured by the camera module. By including components which tilt a sensor assembly within a camera module, a simple camera module having a fixed field of view can be operated in a way that approximates features of a more complex camera module, and the operation of more complex camera modules can be further enhanced.

30 Claims, 8 Drawing Sheets

(56) References Cited

U.S. PATENT DOCUMENTS

| | | | |
|---|---|---|---|
| 2011/0234832 A1* | 9/2011 | Ezoe | H04N 5/232 348/222.1 |
| 2014/0111650 A1 | 4/2014 | Georgiev et al. | |
| 2014/0362205 A1 | 12/2014 | Sasaki | |

FOREIGN PATENT DOCUMENTS

| | | |
|---|---|---|
| JP | 2005210417 A | 8/2005 |
| JP | 2005284212 A | 10/2005 |

* cited by examiner

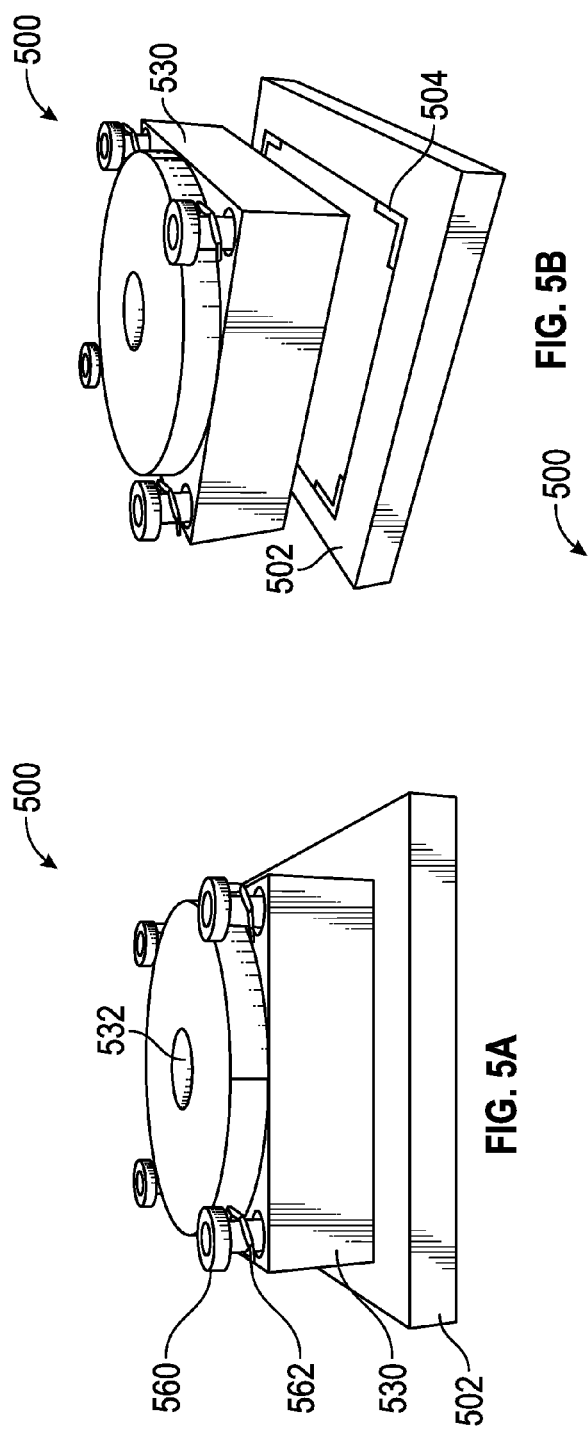

TILTABLE CAMERA MODULE

TECHNICAL FIELD

This disclosure relates to camera modules, and in particular camera modules which can be operated to provide an effective field of view wider than the actual field of view of the camera module and to provide an effective resolution higher than that of the camera module.

DESCRIPTION OF THE RELATED TECHNOLOGY

Many mobile or portable electronic devices, such as smartphones, personal cameras, and tablet computers, include one or more integrated camera modules. These camera modules may include camera optics and an image sensor, and may also include associated processing circuitry. With increased thinness and decreased weight of such portable electronic devices, the thickness and weight of each component becomes important. Because the thickness and weight of such devices can be important features of the device, camera modules are often made as small as possible. However, these smaller camera modules often lack features present in other devices with cameras, e.g., discrete camera devices, which can be much larger and more complex.

SUMMARY

The systems, methods and devices of this disclosure each have several innovative aspects, no single one of which is solely responsible for the desirable attributes disclosed herein.

One innovative aspect of the subject matter described in this disclosure can be implemented in an electronic device including a tiltable camera module, including an image sensor, camera optics spaced apart from the image sensor, at least one actuator component configured to tilt the image sensor and camera optics together, and control circuitry configured to control the at least one actuator component to tilt the image sensor and camera optics through a plurality of discrete tilted positions.

In some implementations, the control circuitry can be additionally configured to initiate the capture of at least one image after the image sensor and camera optics are moved to each of the plurality of discrete positions. In some further implementations, the control circuitry can be configured to initiate the capture of video during movement of the image sensor and camera optics to each of the plurality of discrete positions. In some other further implementations, the device can additionally include a software module configured to combine the images captured at a plurality of discrete tilted positions into a single composite image. In some other further implementations, the device can additionally include a hardware module configured to combine the images captured at a plurality of discrete tilted positions into a single composite image. In some other further implementations, the control circuitry can be configured to tilt the image sensor and camera optics to four discrete tilted positions and initiate the capture of at least one image while the image sensor and camera optics are in each of the four discrete tilted positions.

In some implementations, the device can further include a housing containing the image sensor and the camera optics, where tilting the image sensor and camera optics together includes tilting the housing. In some further implementations, the device can include a printed circuit board (PCB) underlying the housing, and at least one support structure supported by the PCB and supporting the housing in a tiltable manner. In still further implementations, the at least one support structure can include a plurality of pins extending through a portion of the housing, and the at least one actuator component can include a magnet and a coil disposed adjacent each of the plurality of pins. In other further implementations, the at least one actuator component can include at least one linear motor configured to translate at least one cam structure relative to at least one cam structure attached to the housing to cause tilting of the image sensor and camera optics. In still further implementations, the housing can include two support arms located on opposite sides of the housing, each support arm including two cam structures, and the at least one actuator component can include two linear motors, each linear motor including an outwardly extending arm extending parallel to a support arm, each outwardly extending arm including two cam structures configured to interact with the cam structures on the support arms. In other further implementations, the at least one actuator component can include an asymmetrical rotatable structure.

In some implementations, the camera optics can be disposed at a fixed distance from the image sensor. In some implementations, the camera optics can be movable relative to the image sensor to vary the field of view of the sensor assembly.

Another innovative aspect of the subject matter described in this disclosure can be implemented in an electronic device including a tiltable camera module, including a sensor assembly including an image sensor, and camera optics spaced apart from the image sensor, one or more actuator components capable of tilting the sensor assembly to a plurality of tilted positions, and a software module configured to combine images captured at each of the plurality of tilted positions into a single composite image.

In some implementations, a composite image formed by the software module can have an effective field of view which is larger than the fields of view of the images captured by the sensor assembly. In some implementations, the device can additionally include control circuitry for tilting the sensor assembly through a plurality of discrete tilted positions.

In some implementations, the software module can be executed on a processor of the electronic device. In some implementations, the electronic device can include a discrete sensor module including the sensor assembly and the one or more actuator components, and where the software module is executed on a processor or circuitry within the discrete camera module. In some implementations, the software module can be configured to interpolate pixels within overlapping sections of the images captured by the sensor assembly.

Another innovative aspect of the subject matter described in this disclosure can be implemented in a method of capturing a composite image, including sequentially tilting a sensor assembly to a plurality of tilted positions, the sensor assembly having an associated field of view, capturing at least one image using the sensor assembly at each of the plurality of tilted positions, and forming a composite image by combining the images captured by the sensor assembly at each of the plurality of tilted positions.

In some implementations, the method can be performed in response to a single user input. In some implementations, capturing at least one image using the sensor assembly at each of the plurality of tilted positions can include capturing video during the tilting of the sensor assembly to the plurality of tilted positions.

Another innovative aspect of the subject matter described in this disclosure can be implemented in a non-transitory computer readable medium including instructions that when executed cause a processor to perform a method of capturing a composite image, the method including sequentially tilting a sensor assembly to a plurality of tilted positions, the sensor assembly having an associated field of view, capturing at least one image using the sensor assembly at each of the plurality of tilted positions, and forming a composite image by combining the images captured by the sensor assembly at each of the plurality of tilted positions.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5A is a perspective view of one implementation of a tiltable camera module.

FIG. 5B is an exploded perspective view of the tiltable camera module of FIG. 5A, viewed from above.

FIG. 5C is an exploded perspective view of the tiltable camera module of FIG. 5A, viewed from below.

Like reference numbers and designations in the various drawings indicate like elements.

DETAILED DESCRIPTION

While the following description includes a description of certain implementations, a person having ordinary skill in the art will readily recognize that the teachings herein can be applied in implementations other than the implementations specifically discussed herein. The described implementations may be implemented in any device, apparatus, or system that includes or forms a part of a camera module, including but not limited to electronic devices such as mobile telephones, smartphones, tablet computers, personal cameras, portable computers, and any other suitable electronic device.

A wide variety of electronic devices can include an integrated camera. In some implementations, the camera may be a discrete module which may be included in the electronic device, while in other implementations the camera hardware may be integrated into one or more components of the electronic device. While the following description contains references to camera modules, the devices and methods described herein may be used in conjunction with integrated cameras as well as in conjunction with devices utilizing discrete camera modules.

Figure 1:
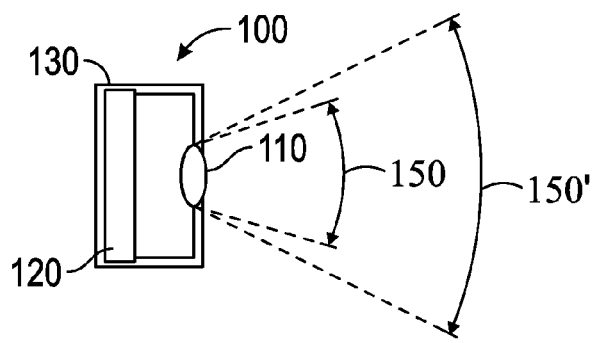
FIG. 1 shows a side cross-section of an example of a camera module.

FIG. 1 schematically illustrates a side cross-section of an example of a camera module. A camera module 100 can include a sensor assembly in the form of camera optics 110, such as one or more lenses, spaced apart from an image sensor 120 such as a charge-coupled device (CCD) sensor or a CMOS sensor. A housing 130 may enclose some or all of the components of the camera module 100. In some implementations, the camera module 100 may have a variable focal length. In such implementations, the spacing between the camera optics and the sensor can be altered to accommodate changes in the focal length, and the camera module 100 may include mechanisms for translating some or all of the camera optics 110 relative to the image sensor 120.

FIG. 1 also schematically illustrates the field of view 150 of the camera module 100, which is a function of the focal length of the camera module 100. In an implementation in which the camera module 100 has a variable focal length, the camera module 100 can be provided with optical zoom capabilities, similar to those of a discrete camera. In particular, the field of view 150 of the camera module 100 can be varied. A change in the focal length of the camera module 100 can increase the field of view 150 to a wider field of view 150', allowing the camera module 100 to capture an image covering a wider area. However, the inclusion of optical zoom capabilities in a camera module increases the cost of the camera module, due to the inclusion of additional or more complex components such as the mechanism for translating the camera optics 110 relative to the image sensor 120. A variable focal length may also increase the size of the housing 130 of the camera module 100 to provide room for translation of the camera optics 110. While digital zoom can be used to capture a smaller image within the field of view of a fixed focal length camera module, it cannot be used to zoom out to capture a wider field of view. In addition, the use of digital zoom can affect the image quality and/or resolution of the captured image, as only a subset of the pixels of the camera sensor are utilized in capturing a digitally zoomed image.

In many implementations, the size of the electronic device can be an important feature of the device. Particularly for portable devices, the dimensions and/or weight of the device may be reduced by utilizing components which are as small and/or as light as practicable. For cost and space considerations, many portable electronic devices utilize camera modules which have lenses with fixed focal lengths.

Figure 2:
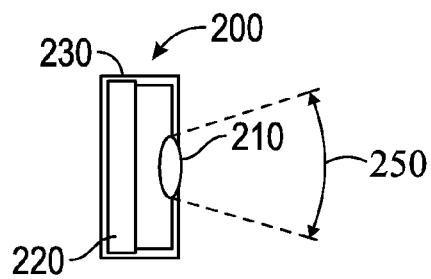
FIG. 2 schematically illustrates a camera module having a fixed field of view.

FIG. 2 schematically illustrates a camera module having a fixed field of view. The camera module 200 is structurally similar to the camera module 100 of FIG. 1, except that the camera module 200 has a fixed focal length, and the camera optics 210 need not be translatable relative to the image sensor 220. The substantially fixed positioning of the camera optics 210 relative to the image sensor 220 within the sensor assembly eliminates the need for mechanisms for translating the camera optics 210, simplifying the construction of the camera module 200 and reducing the cost. In addition, the size of the housing 230 can be smaller than the size of the housing 130 of the camera module 100 of FIG. 1, as the housing 230 does not need to provided clearance for translation of the camera optics 210.

A fixed focal length camera module such as camera module 200 may therefore be less expensive and/or more compact than the camera module 100 of FIG. 1. However, the camera module 200 lacks optical zoom capabilities and has a fixed field of view 250. In some implementations, software features can be used to approximate features lacking in a camera module. Software scaling and interpolation can be used to simulate the effect of an optical zoom, but may be inferior to optical zooming as the light incident upon the image sensor is not changed. User-directed fusion of multiple images through panorama features or similar features can be used to capture an image larger than the field of view of the fixed focal length camera module, but such user-directed fusion may be slow, inaccurate, and complex. The delays involved in user movement of the camera module can lead to undesirable optical effects such as blurriness or a rolling shutter effect, and a significant amount of time may elapse between the capture of individual images in the panorama or similar composite image.

Figure 3:
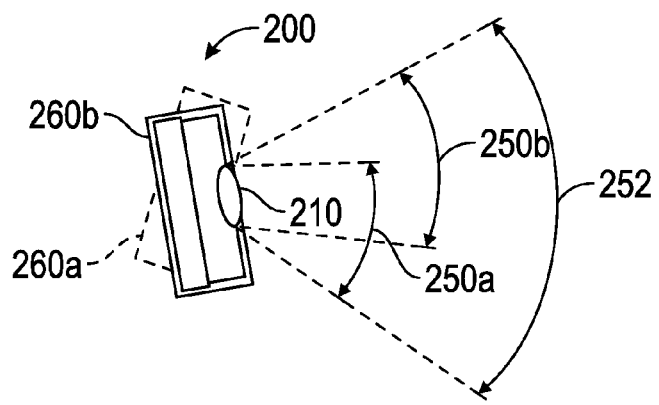
FIG. 3 schematically illustrates tilting of the camera module of FIG. 2 to provide a larger effective field of view.

While the size and orientation of the field of view 250 is fixed relative to the camera module 200, movement of the camera module 200 itself can shift the field of view 250 to change the image captured by the camera module 200. FIG. 3 schematically illustrates tilting of the camera module of FIG. 2 to provide a larger effective field of view. In FIG. 3, it can be seen that the camera module 200 has been tilted from a first position 260a, shown in outline, at which the camera module 200 has a first field of view 250a to a second position 260b at which the camera module 200 has a second field of view 250b. While there is some overlap between the two fields of view 250a and 250b, each field of view 250a and 250b also includes a unique section not covered by the other, such that the combination of the fields of view 250a and 250b provides an effective combined field of view 252 which is larger than either of the individual fields of view 250a and 250b, which are of a fixed size.

Although certain implementations discussed herein are described with respect to camera modules which have fixed focal lengths, the implementations discussed herein can also be implemented using camera modules having variable focal lengths. These implementations may enable a further increase in effective field of view beyond the field of view of a variable focal length camera module at its shortest focal length. These implementations may also enable an increased effective resolution at any focal length of the variable focal length camera.

Figure 4A:
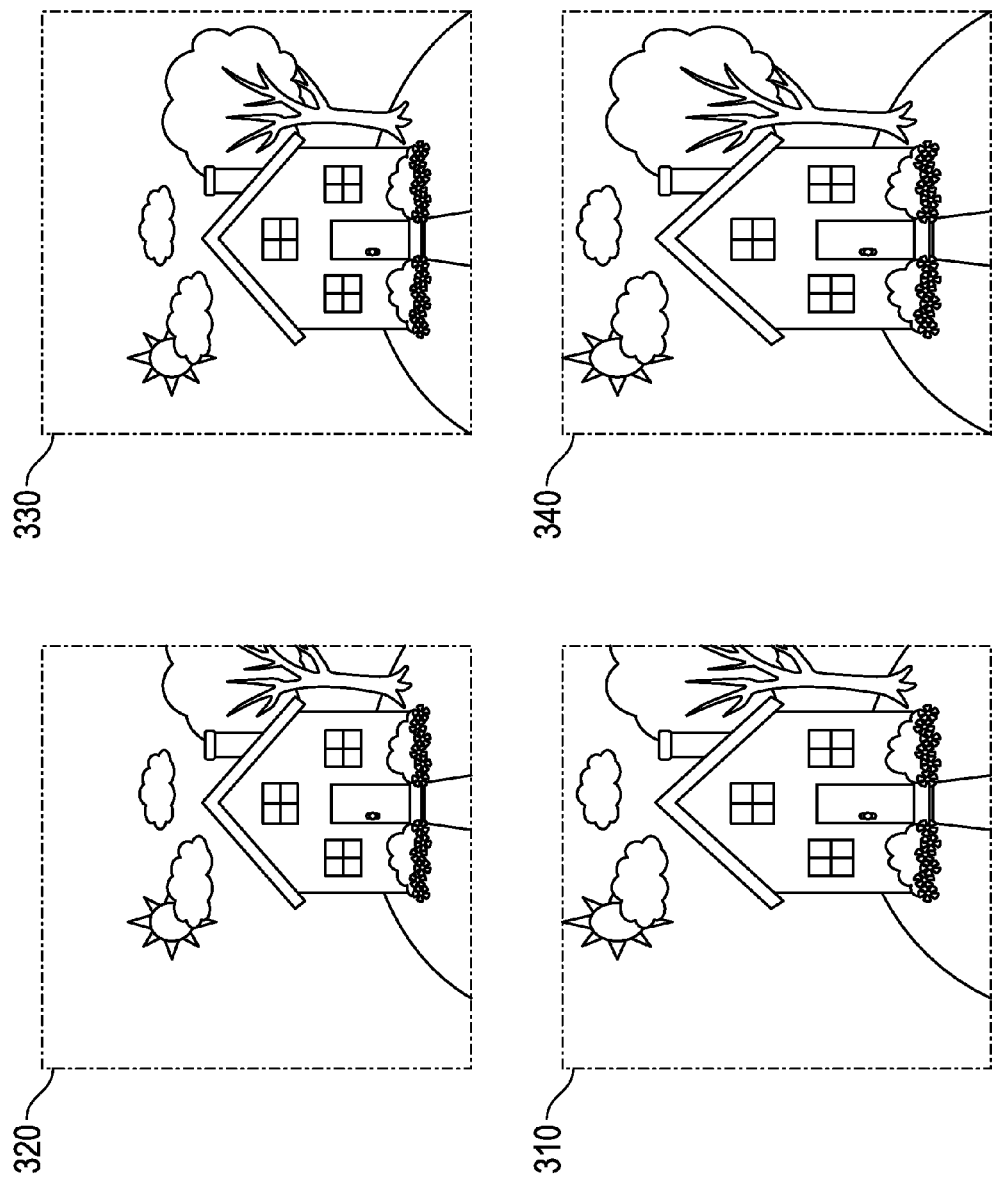
FIG. 4A illustrates multiple individual images captured in succession.
Figure 4C:
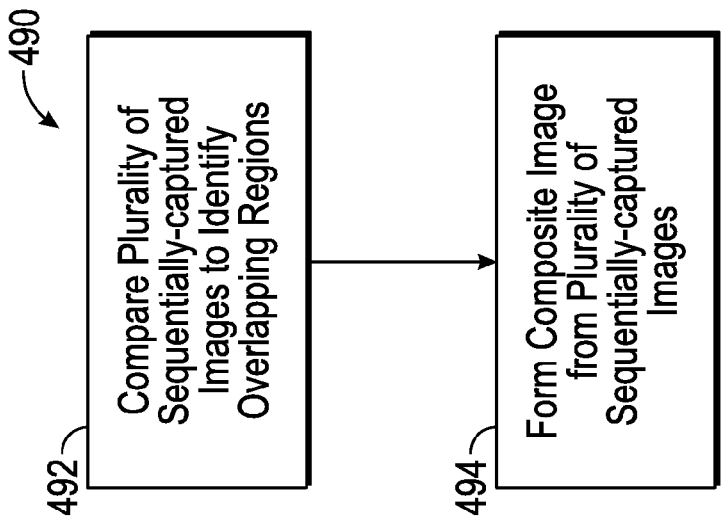
FIG. 4C is a flow diagram illustrating an example method for creating a composite image using a plurality of images taken in succession.
Figure 4B:
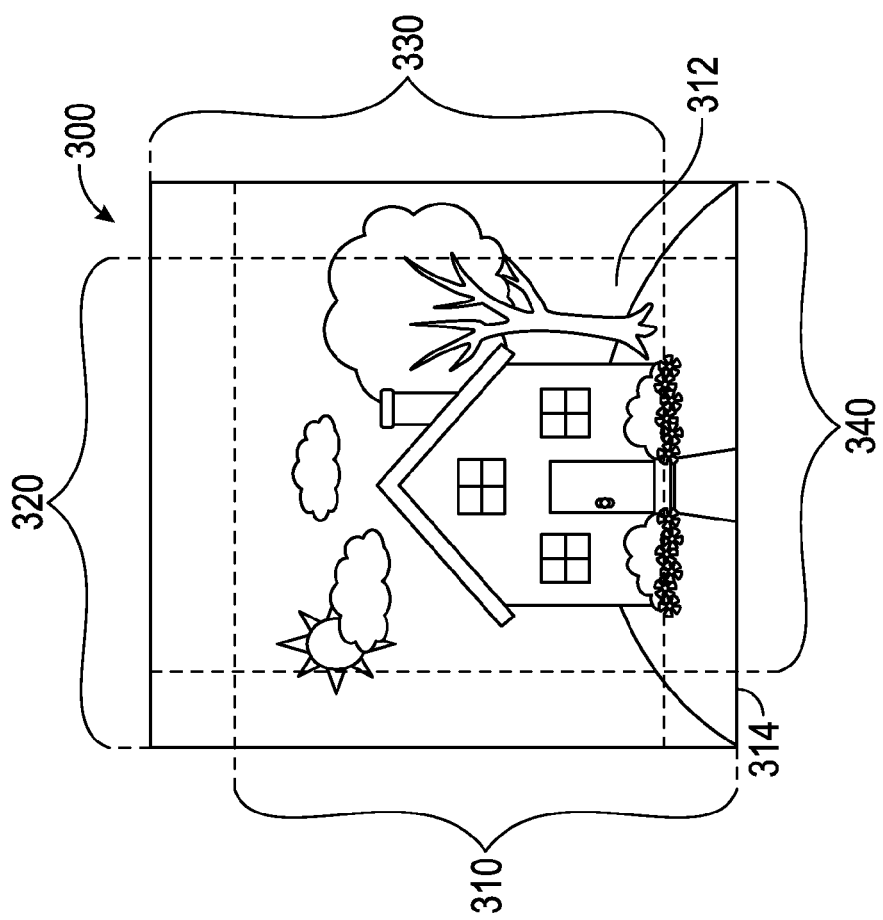
FIG. 4B illustrates the combination of multiple images combined to form a composite image having a larger field of view than the individual images.

FIG. 4A illustrates multiple individual images captured in succession, and FIG. 4B illustrates the combination of multiple images combined to form a composite image having a larger field of view than the individual images. In FIG. 4A, four images 310, 320, 330, and 340 have been taken of the same scene at slightly different orientations. In FIG. 4B, the four different images 310, 320, 330, and 340 have been aligned with one another, and partially overlap with one another within the boundaries of a larger region 300. Each of images 310, 320, 330, and 340 includes a region which overlaps with at least one other of images 310, 320, 330, and 340, and a unique region specific to that image. For example, image 310 includes an L-shaped common region 312 which overlaps with at least one other image at every part of the L-shaped common region 312, and a rectangular unique region 314 which does not overlap with any other of images 320, 330, or 340.

The individual images 310, 320, 330, and 340 can be combined to form a composite image which covers the entire region 300 and which has a larger effective field of view than the fields of view of the individual images 310, 320, 330, and 340. In some implementations, the images may be stitched together by a module which can be implemented either in software or hardware and which may compare any overlapping sections of the images 310, 320, 330, and 340 to align the images relative to one another. In addition, interpolation of the pixels within the overlapping sections of the images 310, 320, 330, and 340 may be used to compensate for any discrepancies between the overlapping sections of images 310, 320, 330, and 340. In place of or addition to pixel interpolation, alignment and combining of multiple images may also include any other suitable image matching algorithms or techniques, including but not limited to flare reduction, triple-A lock, and color matching. The alignment of multiple images can also occur passively, as a result of an integrated image stabilization system, for example. These algorithms and techniques may be implemented in any combination of software and hardware modules.

As described herein, these images may be discrete images captured by a camera module, or may be frames of a video captured during tilting of a camera module. In an implementation in which the images are frames of a camera module, the frames may be contiguous or non-contiguous. The images may also themselves be composite or modified images formed by analysis and/or processing of multiple video frames, such as to reduce blur, rolling shutter, or other visual artifacts.

Because multiple full-resolution images 310, 320, 330, and 340 are stitched together to form a larger composite image, the resolution of the composite image may be higher than the maximum resolution of a fixed focal length camera module used to capture the individual images 310, 320, 330, and 340. In addition to increasing the effective field of view of the fixed focal length camera module, the effective resolution of the camera module can also be increased through the use of multiple images to form a composite image. Because the effective resolution of the camera module is increased, digital zooming or subsequent cropping of the image can be more effective, resulting in increased image quality.

When the images 310, 320, 330, and 340 are stitched together to form a composite image, discrepancies between the content of the images 310, 320, 330, and 340, particularly the overlapping sections of the images, will complicate the fusion of the images and may result in blurriness, rolling shutter, or other undesirable optical effects. In order to reduce the differences between the images 310, 320, 330, and 340, and improve the quality of a composite image formed using those images, the images 310, 320, 330, and 340 may be taken in rapid succession.

Although images 310, 320, 330, and 340 are illustrated as including overlapping sections, the formation of composite images can also be performed when one or more images do not overlap with any adjacent images. For example, in some implementations, the images may capture discrete and unique sections of the total field of view covered by the images, and gaps between the images may be filled using pixel to pixel stitching, interpolation, or any other suitable content aware image filling algorithm or method.

FIG. 4C is a flow diagram illustrating an example method for creating a composite image using a plurality of images taken in succession. The method 490 begins at a block 492, where a plurality of sequentially captured images are analyzed to identify overlapping regions, if any. As discussed above, the plurality of images may in some implementations be discretely captured images, but may in other implementations be or be based on frames of a video captured during tilting or other movement of a camera module. In some implementations, the method can include identification of overlapping regions of the images. In some implementations, one or more of the images may not include any overlapping regions, and other image analysis may be used to orient the non-overlapping image or images relative to the other images.

The method 490 then moves to a block 494, where a composite image is formed from the plurality of sequentially-captured images. The formation of the composite image may include any suitable image processing algorithm or technique, whether implemented in hardware, software, or a combination of hardware and software. The formation of the composite image may include pixel interpolation or any other suitable image processing technique or algorithm, including but not limited to the techniques and algorithms specifically discussed herein. The particular techniques in forming a composite image may vary based on the content of the plurality of images, and may in some implementations be based on the determination of overlapping regions of the images. In some implementations, the formation of the composite image may be performed without explicit identification of overlapping image regions as a discrete step in the method.

In some implementations, the camera module may include a tilting mechanism which sequentially moves the camera module to a plurality of different positions, so that an image may be captured in each of these positions in succession. In some particular implementations, as discussed in greater detail below, these positions may be a series of known, fixed, or predetermined positions. The orientation of the camera module in these positions may be controlled by the design of the camera module. For example, the camera may be tilted in a first direction to the maximum displacement permitted in the first direction by the camera module, and then tilted in other directions to the maximum displacement permitted in those directions. By tilting the camera module until it is stopped by another component, the camera module may be quickly tilted through a series of known positions, and oscillation at those positions can be minimized. In this way, a series of images can be captured in rapid succession, and the quality of the resultant composition image can be improved.

FIG. 5A is a perspective view of one implementation of a tiltable camera module. FIG. 5B is an exploded perspective view of the tiltable camera module of FIG. 5A, viewed from above. FIG. 5C is an exploded perspective view of the tiltable camera module of FIG. 5A, viewed from below.

The camera module 500 includes a supporting substrate 502 and a housing 530 suspended over the supporting substrate 502 by four support structures such as support pins 560 located at each corner of the housing 530. The housing 530 may enclose a sensor assembly which includes camera optics disposed adjacent an aperture 532 in the housing 530, and an image sensor disposed within the housing on the opposite side of the camera optics as the aperture, such that light entering the aperture 532 of the housing 530 passes through the camera optics before impinging upon the image sensor. In some implementations, the supporting substrate 502 may be a printed circuit board (PCB) or other component which can provide electrical communication with the components within the housing 530, and can include or support control and/or image processing circuitry, as discussed in greater detail below.

Springs 562 surround a portion of the support pins 560 and overly the portions of the housing 530 through which the support pins 560 pass. In the illustrated implementation, the springs 562 bias the housing 530 away from the supporting substrate 502, such that the housing 530 will assume a static position spaced apart from the supporting substrate 502, with the base of the housing 530 generally parallel to the supporting substrate 502.

It can be seen in FIG. 5B that the supporting substrate 502 includes, at locations underlying each corner of the housing 530, an actuator component configured to assist in the tilting of the housing 530. In the illustrated implementation, the actuator components within or supported by the supporting substrate 502 include coils 504. It can also be seen in FIG. 5C that the housing 530 includes, at locations at or near each corner of housing 530, an actuator component also configured to assist in the tilting of the housing 530. In the illustrated implementation, the actuator components within or supported by the housing 530 include magnets 534 configured to interact with the respective underlying coil 504 of the supporting substrate 502 to displace a corner of the housing 530 to move the housing 530 and the sensor assembly contained therein relative to the remainder of the camera module 500. The magnets 534 may be neodymium magnets or any other suitable magnets or magnetic field sensitive material. For example, in the illustrated implementation, a magnetic attractive force between a coil 504 and a magnet 534 can be used to displace a corner of the housing 530.

A wide variety of other actuator components can be used. In some implementations, actuator components need not be located on both the supporting substrate 502 and the housing 530. For example, a piezoelectric material located on one of the supporting substrate 502 or the housing 530 can be deformed in response to application of a voltage, and the induced deformation can move a corner of the housing 530 away from the supporting substrate 502.

By sequentially utilizing the actuator components at each corner of the housing 530, the housing 530 and the enclosed sensor assembly, which includes the camera optics and the image sensor, can be moved through a plurality of positions. One or more images may be recorded at each of these positions, and the images stitched or fused together to form a composite image. Although the size of the field of view of the camera module remains fixed, the orientation of the field of view will change at each position, so that the resulting composite image has a wider effective field of view than the actual field of view of the fixed focal length camera module.

In addition, in an implementation such as the implementation illustrated in FIGS. 5A through 5C, the tiltable camera module and the supporting components define maximum positions to which the tiltable camera module can be tilted in a given direction, as the tiltable camera module will be pulled against the underlying component which serves as a stop. As discussed above, because the actuator components tilt the camera module until it is stopped by another component, the camera module can quickly be tilted to a known position, and will stabilize at the known position without significant oscillation. This rapid repositioning of the camera module allows capture of images in a plurality of known positions in rapid succession. The overlapping sections of the captured images will have less variation, increasing the quality of the composite image and reducing the amount of time required to form such a composite image. composition image can be improved.

Figure 6B:
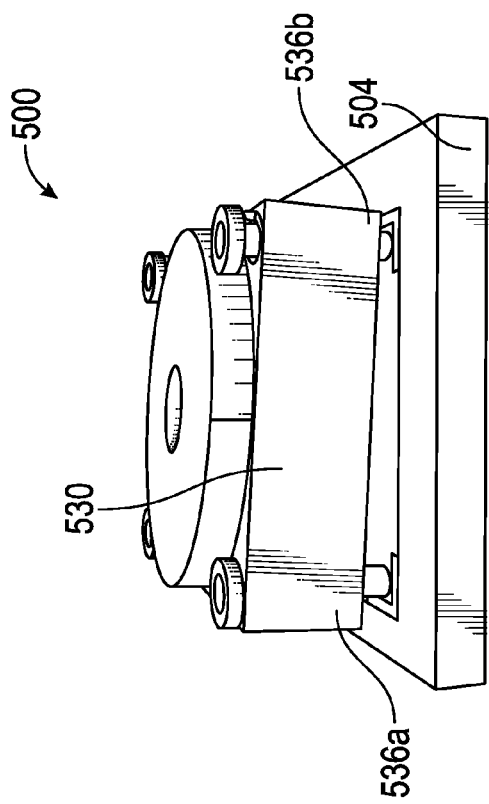
FIG. 6B is a perspective view of the tiltable camera module of FIG. 5A in which the camera module has been tilted to a second tilted position.
Figure 6A:
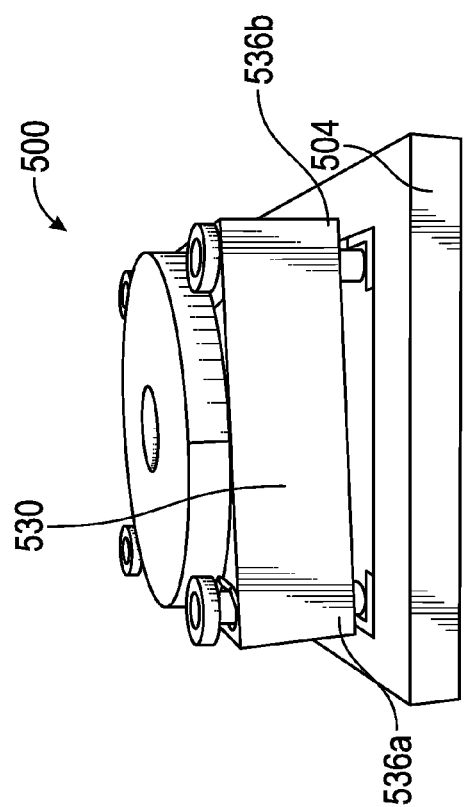
FIG. 6A is a perspective view of the tiltable camera module of FIG. 5A in which the camera module has been tilted to a first tilted position.

FIG. 6A is a perspective view of the tiltable camera module of FIG. 5A in which the camera module has been tilted to a first tilted position. In FIG. 6A, the actuator components at a first corner 536a of the housing 530 have been used to displace the first corner 536a of the housing 530 towards the underlying supporting substrate 502, tilting the housing 530 and the enclosed camera optics and image sensor to shift the field of view of the camera module 500. The force generated by the actuator components at the first corner 536a of the housing 530 is sufficient to overcome at least part of the restoring force of the spring 562 overlying the first corner 536a of the housing 530. Because of the rigidity of the housing 530, the corners adjacent the first corner 536a of the housing 530, including second corner 536b, may be spaced a smaller distance apart from the underlying substrate 502, while the corner opposite the first corner 536a of the housing 530 may be spaced the furthest from the underlying substrate 502.

FIG. 6B is a perspective view of the tiltable camera module of FIG. 5A in which the camera module has been tilted to a second tilted position. In FIG. 6B, the actuator components at the second corner 536b of the housing 530 have been used to displace the second corner 536b of the housing 530 towards the underlying supporting substrate 502. With the housing 530 in a second tilted position, the field of view of the camera module 500 is shifted to a position different than that of FIG. 6A. By sequentially operating the actuator components at each corner of the housing 530, the housing 530 may be sequentially moved through four distinct tilted positions. When an image is captured at each of these tilted positions, the captured images may be combined to form a single composite image having a wider effective field of view than the fixed actual field of view of the camera module 500.

A device including the camera module 500 may include control circuitry for controlling the actuator components of the camera module 500 to move the sensor assembly through a plurality of positions. The control circuitry can also direct the camera module 500 to capture at least one image at each of the plurality of positions. In some implementations, some or all of the control circuitry may be included in a discrete camera module. In some implementations, some or all of the control circuitry may be included elsewhere within an electronic device including the camera module 500. In some implementations, one or more software modules may control operation of one or both of the actuator components or image capture of the camera module, and may be executed on a processor or circuitry within either a discrete camera module or in a processor of the electronic device including the camera module.

Similarly, a device including the camera module 500 may include a software module for forming a composite image from a plurality of images recorded by the sensor assembly at different tilt positions. In some implementations, the camera module 500 itself may include a processor or dedicated circuitry for executing this software module, while in other implementations, the electronic device itself may include a processor which executes the software module.

Figure 7:
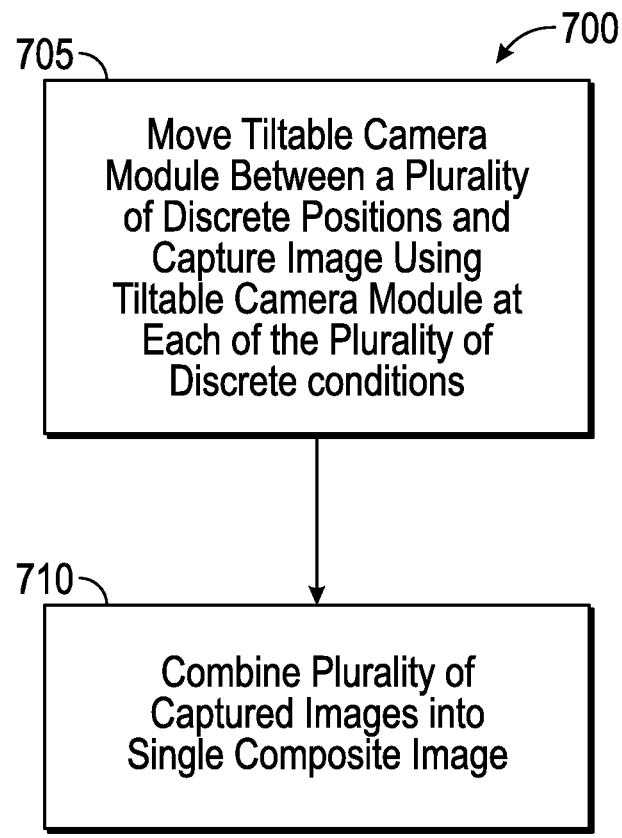
FIG. 7 is a flow diagram illustrating an example method for creating a composite image using a tiltable camera module.

FIG. 7 is a flow diagram illustrating an example method for generating a composite image with a tiltable camera module. In block 705 of the method 700, a tiltable camera module is moved between a plurality of discrete positions, and an image is recorded using the tiltable camera module at each of the plurality of discrete positions. In some implementations, the sequential actuation of the tiltable camera module may be done in response to a single user input, or may be triggered automatically without the need for user input. In some implementations, each of the images captured at the plurality of discrete positions include at least one unique section which does not overlap with any of the other images captured at the plurality of discrete positions.

In block 710 of the method 700, the plurality of images are combined to form a single composite image having an effective field of view wider than the actual field of view of the tiltable camera module. In some implementations, this composite image may be formed using a software module which can in some implementations be a component of the tiltable camera module and can in some other implementations be implemented in an electronic device including the tiltable camera module. The process of combining the plurality of images can in some implementations include alignment of the images relative to one another, and interpolation of the pixels in the overlapping regions of the images to form a single composite image. In some implementations, the resulting composite image may have a resolution larger than the resolution of each of the individual images taken at each position of the tiltable camera module.

Figure 8A:
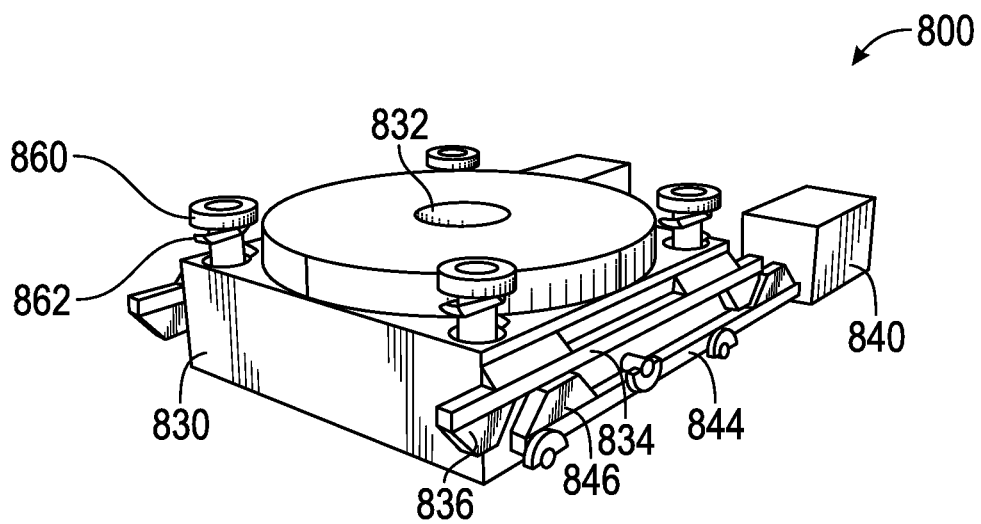
FIG. 8A is a perspective view of another implementation of a tiltable camera module.
Figure 8B:
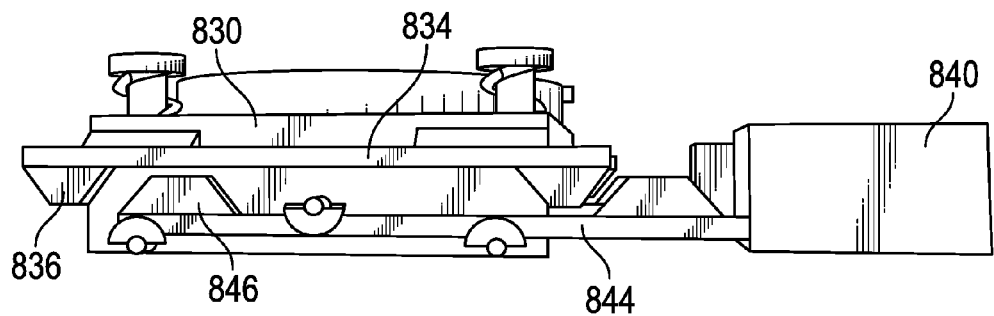
FIG. 8B is a side elevation view of the tiltable camera module of FIG. 8A.
Figure 8C:
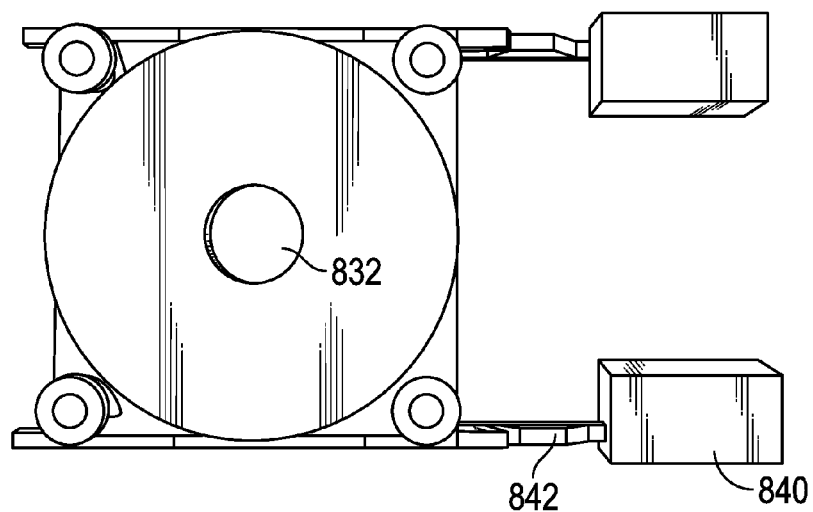
FIG. 8C is a top plan view of the tiltable camera module of FIG. 8A.

In addition to the actuation mechanisms discussed above, a wide variety of other mechanisms can be used to actuate a tiltable camera module between a plurality of positions. FIG. 8A is a perspective view of another implementation of a tiltable camera module. FIG. 8B is a side elevation view of the tiltable camera module of FIG. 8A. FIG. 8C is a top plan view of the tiltable camera module of FIG. 8A. The tiltable camera module 800 includes a housing 830 enclosing a sensor assembly including camera optics and an image sensor. The housing 830 is supported by support pins 860 at each corner of the housing 830, with springs 862 biased to maintain the housing 830 in a desired position.

Opposite sides of the housing 830 include support arms 834 extending horizontally along the sides of the housing 830, with each support arm 834 having two cam structures 836 extending vertically downward from the underside of the support arm 834. Also supported by an underlying substrate (not shown) are a pair of linear motors 840, each linear motor 840 having an outwardly extending arm 844 which is axially translatable via the linear motor 840. The outwardly extending arm 844 of the linear motor 840 includes two cam structures 846 extending vertically upward from the upper side of the outwardly extending arm 844.

In the illustrated implementation, the spacing between the cam structures 836 on the support arm 834 is different from the spacing between the cam structures 846 on the outwardly extending arm 844 connected to the linear motor 840. As the outwardly extending arm 844 is translated away from the linear motor 840, one of the cam structures 846 on the outwardly extending arm 844 will make contact with one of the cam structures 836 on the support arm 834, pushing up the corresponding corner of the housing 830 to place it in a first tilted position. As the outwardly extending arm 844 continues to translate away from the linear motor, the first pair of cam structures will pass one another while the second pair of cam structures remain in contact with one another, placing the housing 830 in a second tilted position. Linear translation of the other outwardly extending arm 844 connected to the other linear motor 840 will similarly move the housing 830 to a third and fourth tilted position as the cam structures on the other side of the housing 830 slide over one another.

Figure 9A:
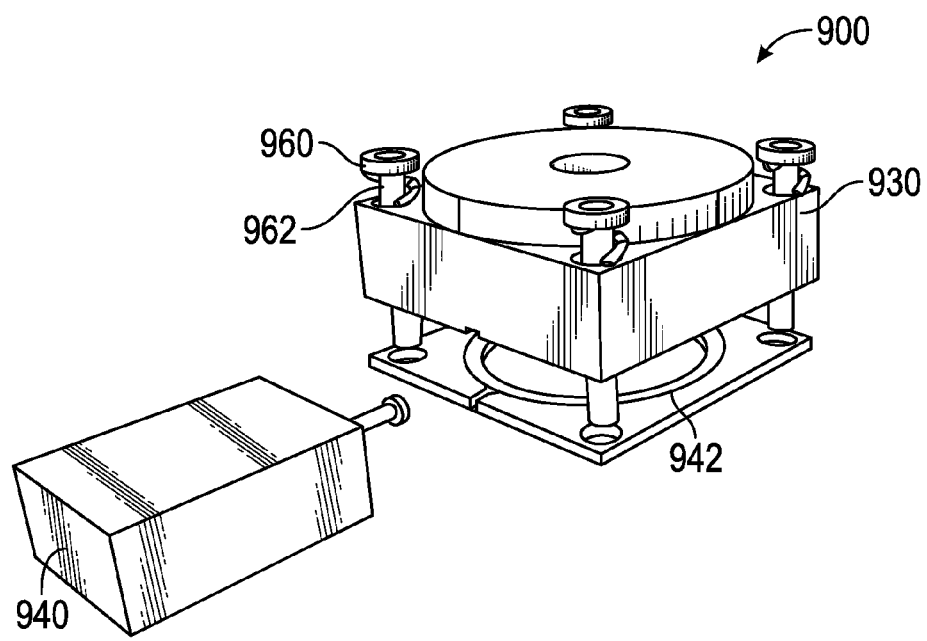
FIG. 9A is a perspective view of another implementation of a tiltable camera module.
Figure 9B:
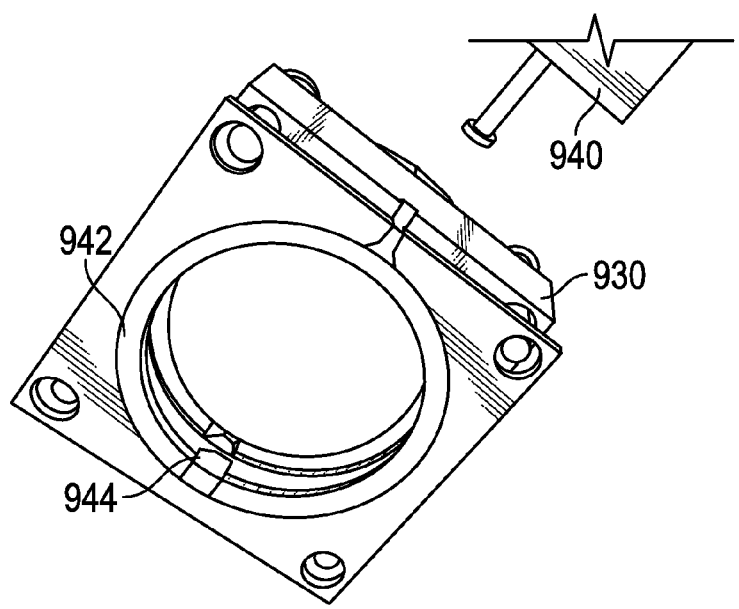
FIG. 9B is a perspective view of the tiltable camera module of FIG. 9A, viewed from below.

FIG. 9A is a perspective view of another implementation of a tiltable camera module. FIG. 9B is a perspective view of the tiltable camera module of FIG. 9A, viewed from below. The tiltable camera module 900 also includes a housing 930 enclosing a sensor assembly including camera optics and an image sensor. The housing 930 is supported by support pins 960 at each corner of the housing 930, with springs 962 biased to maintain the housing 930 in a desired position. A rotational motor 940 is configured to rotate an asymmetrical ring 942 or other asymmetrical rotatable structure which varies in height at different locations around the asymmetrical ring 942. In some implementations, the asymmetrical ring 942 may include a gradual slope increasing to a maximum height, while in other implementations, the asymmetrical ring 942 may include a discrete raised section such as tooth 944. As the asymmetrical ring 942 is rotated via the rotational motor 940, the portion of the housing 930 overlying and in contact with the highest portion of the asymmetrical ring 942, such as raised tooth 944, will be tilted away from the underlying support substrate, allowing actuation of the tiltable camera module through a range of tilted positions.

The above implementations of tiltable camera modules may be used in conjunction with a wide variety of electronic devices. As discussed above, while the above implementations discuss discrete tiltable camera modules, some or all of the components discussed above in the various implementations may be integrated directly into electronic devices. In addition, although the implementations described above may provide additional benefits when used with fixed focal length camera modules, the devices and methods described herein can also be used in conjunction with camera modules with variable focal lengths, as well.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the orientation of a tiltable camera module as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An electronic device including a tiltable camera module, comprising:
   an image sensor;

camera optics spaced apart from the image sensor;
at least one actuator component configured to tilt the image sensor and camera optics together, wherein the at least one actuator component includes at least one linear motor configured to translate at least a first cam structure relative to at least a second cam structure to cause tilting of the image sensor and camera optics; and
control circuitry configured to control the at least one actuator component to tilt the image sensor and camera optics through a plurality of discrete tilted positions.

2. The device of claim 1, wherein the control circuitry is additionally configured to initiate the capture of at least one image after the image sensor and camera optics are moved to each of the plurality of discrete positions.

3. The device of claim 2, wherein the control circuitry is configured to initiate the capture of video during movement of the image sensor and camera optics to each of the plurality of discrete positions.

4. The device of claim 2, additionally including a software module configured to combine the images captured at a plurality of discrete tilted positions into a single composite image.

5. The device of claim 2, additionally including a hardware module configured to combine the images captured at a plurality of discrete tilted positions into a single composite image.

6. The device of claim 2, wherein the control circuitry is configured to tilt the image sensor and camera optics to four discrete tilted positions and initiate the capture of at least one image while the image sensor and camera optics are in each of the four discrete tilted positions.

7. The device of claim 1, further comprising a housing containing the image sensor and the camera optics, wherein tilting the image sensor and camera optics together includes tilting the housing.

8. The device of claim 7, wherein the device includes:
a printed circuit board (PCB) underlying the housing; and
at least one support structure supported by the PCB and supporting the housing in a tiltable manner.

9. The device of claim 8, wherein the at least one support structure includes a plurality of pins extending through a portion of the housing, and wherein the at least one actuator component includes a magnet and a coil disposed adjacent each of the plurality of pins.

10. The device of claim 7, wherein the at least a second cam structure is attached to the housing, and wherein the at least one linear motor is configured to translate the at least a first cam structure relative to the at least a second cam structure attached to the housing to cause tilting of the image sensor and camera optics.

11. The device of claim 10, wherein the housing includes two support arms located on opposite sides of the housing, each support arm including two cam structures, and the at least one actuator component includes two linear motors, each linear motor including an outwardly extending arm extending parallel to a support arm, each outwardly extending arm including two cam structures configured to interact with the cam structures on the support arms.

12. The device of claim 7, wherein the at least one actuator component includes an asymmetrical rotatable structure.

13. The device of claim 1, wherein the camera optics are disposed at a fixed distance from the image sensor.

14. The device of claim 1, wherein the camera optics are movable relative to the image sensor to vary the field of view of the sensor assembly.

15. An electronic device including a tiltable camera module, comprising:
a sensor assembly including:
an image sensor; and
camera optics spaced apart from the image sensor, the camera optics configured to tilt together with the image sensor;
one or more actuator components capable of tilting the sensor assembly to a plurality of discrete tilted positions by using an actuator including at least one linear motor to translate at least a first cam structure relative to at least a second cam structure attached to the sensor assembly; and
a software module configured to combine images captured at each of the plurality of tilted positions into a single composite image.

16. The device of claim 15, wherein the composite image formed by the software module has an effective field of view which is larger than the fields of view of the images captured by the sensor assembly.

17. The device of claim 15, additionally including control circuitry for tilting the sensor assembly through a plurality of discrete tilted positions.

18. The device of claim 15, wherein the software module is executed on a processor of the electronic device.

19. The device of claim 15, wherein the electronic device includes a discrete sensor module including the sensor assembly and the one or more actuator components, and wherein the software module is executed on a processor or circuitry within the discrete camera module.

20. The device of claim 15, wherein the software module is configured to interpolate pixels within overlapping sections of the images captured by the sensor assembly.

21. A method of capturing a composite image, including:
sequentially tilting a sensor assembly to a plurality of discrete tilted positions, the sensor assembly including an image sensor and camera optics spaced apart from the image sensor and tiltable together with the image sensor, by translating at least a first cam structure relative to at least a second cam structure attached to the sensor assembly using at least one linear motor to cause sequential tilting of the sensor assembly, the sensor assembly having an associated field of view;
capturing at least one image using the sensor assembly at each of the plurality of discrete tilted positions; and
forming a composite image by combining the images captured by the sensor assembly at each of the plurality of discrete tilted positions.

22. The method of claim 21, wherein forming a composite image includes interpolating pixels within overlapping sections of the images captured by the sensor assembly.

23. The method of claim 21, wherein an effective field of view of the composite image is wider than the field of view of the sensor assembly.

24. The method of claim 21, wherein the method is performed in response to a single user input.

25. The method of claim 21, wherein capturing at least one image using the sensor assembly at each of the plurality of tilted positions includes capturing video during the tilting of the sensor assembly to the plurality of tilted positions.

26. A non-transitory computer readable medium comprising instructions that when executed cause a processor to perform a method of capturing a composite image, the method including:
sequentially tilting a sensor assembly to a plurality of discrete tilted positions, the sensor assembly including an image sensor and camera optics spaced apart from the image sensor and tiltable together with the image sensor, by translating at least a first cam structure relative to at least a second cam structure attached to the sensor assembly using at least one linear motor to cause sequential tilting of the sensor assembly, the sensor assembly having an associated field of view;

capturing at least one image using the sensor assembly at each of the plurality of discrete tilted positions; and forming a composite image by combining the images captured by the sensor assembly at each of the plurality of discrete tilted positions.

27. The method of claim 26, wherein forming a composite image includes interpolating pixels within overlapping sections of the images captured by the sensor assembly.

28. The method of claim 26, wherein an effective field of view of the composite image is wider than the field of view of the sensor assembly.

29. The method of claim 26, wherein the method is performed in response to a single user input.

30. The method of claim 26, wherein capturing at least one image using the sensor assembly at each of the plurality of tilted positions includes capturing video during the tilting of the sensor assembly to the plurality of tilted positions.

* * * * *